(12) United States Patent
Tanaka et al.

(10) Patent No.: US 7,823,187 B2
(45) Date of Patent: Oct. 26, 2010

(54) COMMUNICATION PROCESSING METHOD AND SYSTEM RELATING TO AUTHENTICATION INFORMATION

(75) Inventors: Kosuke Tanaka, Kawasaki (JP); Yasuomi Iriyama, Kawasaki (JP); Ryuichi Sato, Kawasaki (JP); Hiroaki Morikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1064 days.

(21) Appl. No.: 11/522,696

(22) Filed: Sep. 18, 2006

(65) Prior Publication Data

US 2008/0022356 A1    Jan. 24, 2008

(30) Foreign Application Priority Data

Jun. 7, 2006    (JP) .............................. 2006-158033

(51) Int. Cl.
  G06F 17/00     (2006.01)
  G06F 7/04      (2006.01)
  G06F 21/00     (2006.01)
  H04L 9/32      (2006.01)

(52) U.S. Cl. .................. 726/1; 726/2; 726/3; 726/4; 726/5; 726/6; 726/8; 726/27; 726/28; 713/171; 713/182; 713/184; 380/259; 380/277; 380/278

(58) Field of Classification Search .............. 726/1, 726/2; 713/183–184, 171
See application file for complete search history.

(56) References Cited

U.S. PATENT DOCUMENTS

| | | | | |
|---|---|---|---|---|
| 5,349,642 | A * | 9/1994 | Kingdon .................... 713/161 |
| 5,724,423 | A * | 3/1998 | Khello ........................ 713/184 |
| 6,249,585 | B1 * | 6/2001 | McGrew et al. ............. 380/286 |
| 6,775,382 | B1 * | 8/2004 | Al-Salqan .................. 380/286 |
| 7,139,399 | B1 * | 11/2006 | Zimmermann .............. 380/277 |
| 7,251,632 | B1 * | 7/2007 | Ogg et al. ...................... 705/62 |
| 7,260,724 | B1 * | 8/2007 | Dickinson et al. ........... 713/182 |
| 7,353,536 | B1 * | 4/2008 | Morris et al. .................. 726/6 |
| 2003/0046409 | A1 * | 3/2003 | Graham ...................... 709/229 |
| 2003/0214775 | A1 * | 11/2003 | Fukuta et al. ............... 361/220 |
| 2004/0019786 | A1 * | 1/2004 | Zorn et al. .................. 713/168 |
| 2004/0260953 | A1 * | 12/2004 | Jamieson et al. ........... 713/202 |
| 2006/0041756 | A1 * | 2/2006 | Ashok et al. ................ 713/183 |

(Continued)

FOREIGN PATENT DOCUMENTS

JP     2001-117879     4/2001

(Continued)

*Primary Examiner*—Christian LaForgia
*Assistant Examiner*—Jenise E Jackson
(74) *Attorney, Agent, or Firm*—Fujitsu Patent Center (57) ABSTRACT

This invention is to safely and surely distribute authentication information to users or user terminals. This method includes: requesting authentication using predetermined authentication information for an access destination via a network; receiving a notification indicating an authentication failure from the access destination; acquiring currently valid authentication information from an authentication information manager by transmitting data to indicate own legitimacy, and storing the acquired currently valid authentication information into a storage device; and requesting the authentication using the acquired currently valid authentication information for the access destination via the network. Thus, by supposing that a failure in the authentication occurs, and by causing the user side to present the data to indicate own legitimacy for the authentication information manager, the currently valid authentication information is distributed, for example, after the encryption.

6 Claims, 5 Drawing Sheets

U.S. PATENT DOCUMENTS

2006/0117015 A1\* 6/2006 Bisbee et al. .................. 707/9
2007/0083750 A1\* 4/2007 Miura et al. ................ 713/155

FOREIGN PATENT DOCUMENTS

| JP | 2003-152713 | 5/2003 |
| JP | 2003-223398 | 8/2003 |
| JP | 2004-295711 | 10/2004 |
| JP | 2004-302869 | 10/2004 |
| JP | 2005-149341 | 6/2005 |
| JP | 2005-165418 | 6/2005 |

\* cited by examiner

COMMUNICATION PROCESSING METHOD AND SYSTEM RELATING TO AUTHENTICATION INFORMATION

TECHNICAL FIELD OF THE INVENTION

This invention relates to a technique to distribute authentication information.

BACKGROUND OF THE INVENTION

Conventionally, when a service providing server, which provides services only for specific users, receives an access from a user terminal, it carries out an authentication processing by using a user ID and a password to confirm whether or not the access source is the specific user. In such a conventional technique, it is supposed that the correct user ID and password have been distributed to the specific users. However, because a problem such as leakage of the password might occur when the same password has been used for a long time, there is a case where an administrator of the service providing server changes the passwords. In such a case, properly, it is necessary to safely distribute the new password to the specific users. Incidentally, there is case where plural users share one set of the user ID and password. However, when the change of the password is not completely informed to all of the users in such a case, a failure in the authentication for a certain user who does not know the change occurs, and the certain user cannot receive the service from the service providing server. Especially, when the failures in the authentication successively occur predetermined times, the account may be locked. Therefore, a large problem may occur.

For example, JP-A-2001-117879 discloses a technique to efficiently carry out a product sales service and customer management by reducing the load of the store manager and the cost for the system development, its operation or like, and enabling to provide services, which are determined by the store manager, for individual customers. Specifically, a store terminal apparatus transmits an authentication key, which allows the user to utilize the store's service, to a server, in addition to specific information (information concerning good treatment or the like) concerning the service. When the authentication key issued by the store terminal apparatus is inputted by the user, the server allows the user to utilize the store's service based on the authentication key. There is no special device for the distribution of the authentication key.

In addition, JP-A-2003-223398 discloses a technique enabling a Web server to reflect the update to associated other user terminals when the contact destination information is managed on the Web server and one user terminal updates the contact destination information registered on the Web server. Specifically, when one user terminal updates the contact destination information registered on the Web server, the Web server updates the contact destination information on other user terminals whose storage area on the Web server stores a public ID associated with the contact destination information based on the updated contact destination information or the Web server transmits a message about the update to other user terminals, and in response to a request from a certain user terminal, it transmits the updated contact destination information to the certain user terminal, and the certain user terminal updates the contact destination information the certain user terminal holds based on the received contact destination information. The contact destination information is updated. However, an object of this application is to update the distributed data in order to hold the consistency, and information used for the authentication is not updated.

Furthermore, JP-A-2004-302869 discloses a network system, which enables the flexible control of a login state for each service, immediately reflects the change of the login state to other services, suppresses the influence of the performance to the minimum and, furthermore, does not need any special portal. Specifically, each of SSO applications holds login state information in a login state information database, and can flexibly manage the login state. In addition, an access to the SSO application by a client is held as access information into an SSO access information database in an SSO server. When a change request of the login state such as a login or log-out is received from a client, the SSO server utilizes the access information to notify the SSO applications to which the client of the requesting source accessed until then of the login state information. Thus, the login state can be reflected to other service. However, the distribution after the change of the authentication information is not considered.

Moreover, JP-A-2004-295711 discloses a user account management method in a network system, which enables to reduce the user management load by carrying out user uniform management and to reduce the user management load of plural passwords while securing the security by setting different password for each device. Specifically, an authentication server carries out uniform management of the user information of the network system, and a password manager generates and manages a device-unique password combining a basic password determined by a user and a token the user can easily recognize. Furthermore, a function to store the password information and to present a password for a server desired by the user is provided to a portable terminal. Even in this publication, the distribution after the change of the authentication information is not considered.

In addition, JP-A-2005-165418 discloses a technique to carry out authentication at a login by using an ID, a password and an individual ID. Specifically, when a portable terminal accesses a server computer via the Internet and an in-house LAN, the unique individual ID assigned to the portable terminal and an ID and password inputted if necessary are transmitted to a terminal authentication system via a firewall A apparatus. The terminal authentication system carries out the authentication of the portable terminal by using the individual ID held by the portable terminal to compare the individual ID received from the portable terminal with the individual ID registered in advance in an individual ID storage DB, and controls the access to the in-house LAN. Although the access is controlled by introducing the individual ID, the distribution of the authentication information is not considered.

Furthermore, JP-A-2005-149341 discloses a technique in which it is not necessary to share secret information in advance, and an authentication processing and/or an access control for a service providing request is carried out even from a network for which the account is not held. Specifically, first, a service providing server for which a user requests the login accepts user authentication information and management apparatus information (authentication server information), identifies an authentication server, which is a management apparatus of an inquiry destination, based on the management apparatus information, transmits the user's authentication information to the identified authentication server of the inquiry destination, and the authentication server of the inquiry destination managing the user account carries out the authentication processing. The service providing server refers to the authentication result returned from the authentication server of the inquiry destination, and carries out the authentication processing for the user requesting the login. After this user authentication, it responds to the service request desired by the user. Although it is described that the authentication is not carried out by itself, the distribution of the authentication information is not considered.

Thus, such publications does not disclose a configuration to safely and surely distribute the authentication information to users or user terminals in a case where an administrator changes the password regardless of the user's intention, although the authentication information, especially the password, is mainly updated by the user.

SUMMARY OF THE INVENTION

Therefore, an object of this invention is to provide a new technique to distribute authentication information to users or user terminals.

A communication processing method according to a first aspect of this invention comprises: requesting authentication using predetermined authentication information for an access destination via a network; receiving a notification indicating an authentication failure from the access destination; acquiring currently valid authentication information from an authentication information manager by transmitting data to indicate own legitimacy (or authenticity), and storing the acquired currently valid authentication information into a storage device; and requesting the authentication using the acquired currently valid authentication information for the access destination via the network.

Thus, by supposing that a failure in the authentication occurs, and by causing the user side to present the data to indicate own legitimacy for the authentication information manager, the currently valid authentication information is distributed, for example, after the encryption. Therefore, it becomes possible to safely, surely and easily distribute the updated authentication information.

The acquiring may comprise: transmitting a session key request to the authentication information manager; receiving the session key from the authentication information manager; generating a digest corresponding to the session key by a predetermined digest function, and transmitting the digest to the authentication information manager; and when the digest is judged by the authentication information manager to be legitimate, receiving the currently valid authentication information from the authentication information manager. Thus, when the predetermined digest function or a key necessary for it is appropriately managed, the uniquely identified digest is generated. The legitimacy of the user or user terminal can be confirmed.

In addition, the aforementioned transmitting the session key may comprise: requesting the authentication using the predetermined authentication information for the authentication information manager via the network. When the session key is issued after the authentication is carried out by using the past authentication information, it becomes possible to prevent the third party from swindling the authentication information.

Moreover, the communication processing method may further comprise: receiving a notification of an authentication success based on the currently valid authentication information from the access destination; and storing the currently valid authentication information into an authentication information storage. For example, when the authentication success is confirmed, it is possible to store the authentication information after it is confirmed that the authentication information is appropriate for the continuous future utilization.

In addition, a computer system according to a second aspect of this invention comprises: a processing server that carries out an authentication processing by predetermined authentication information; an authentication information manager that holds authentication information used in the authentication processing carried out by the processing server in an authentication information storage, and distributes the authentication information to a client terminal that uses the authentication information; and a client terminal that uses the authentication information and accesses the processing server. Then, after new registration or update of the authentication information used in the authentication processing carried out by the processing server occurs, the processing server notifies the client terminal of an authentication failure when an authentication request is received from the client terminal. In addition, the authentication information manager transmits newly registered or updated currently valid authentication information to the client terminal when data indicating legitimacy (or authenticity) of the client terminal is received from the client terminal.

Incidentally, the data indicating the legitimacy of the client terminal may be a value (digest) of a predetermined digest function for a session key given from the authentication information manager.

Incidentally, it is possible to create a program for causing a computer to execute the method according to the present invention. The program is stored into a storage medium or a storage device such as, for example, a flexible disk, a CD-ROM, a magneto-optical disk, a semiconductor memory, or a hard disk. In addition, the program may be distributed as digital signals over a network in some cases. Data under processing is temporarily stored in the storage device such as a computer memory.

DETAILED DESCRIPTION OF THE PREFERRED EMBODIMENTS

Figure 1:
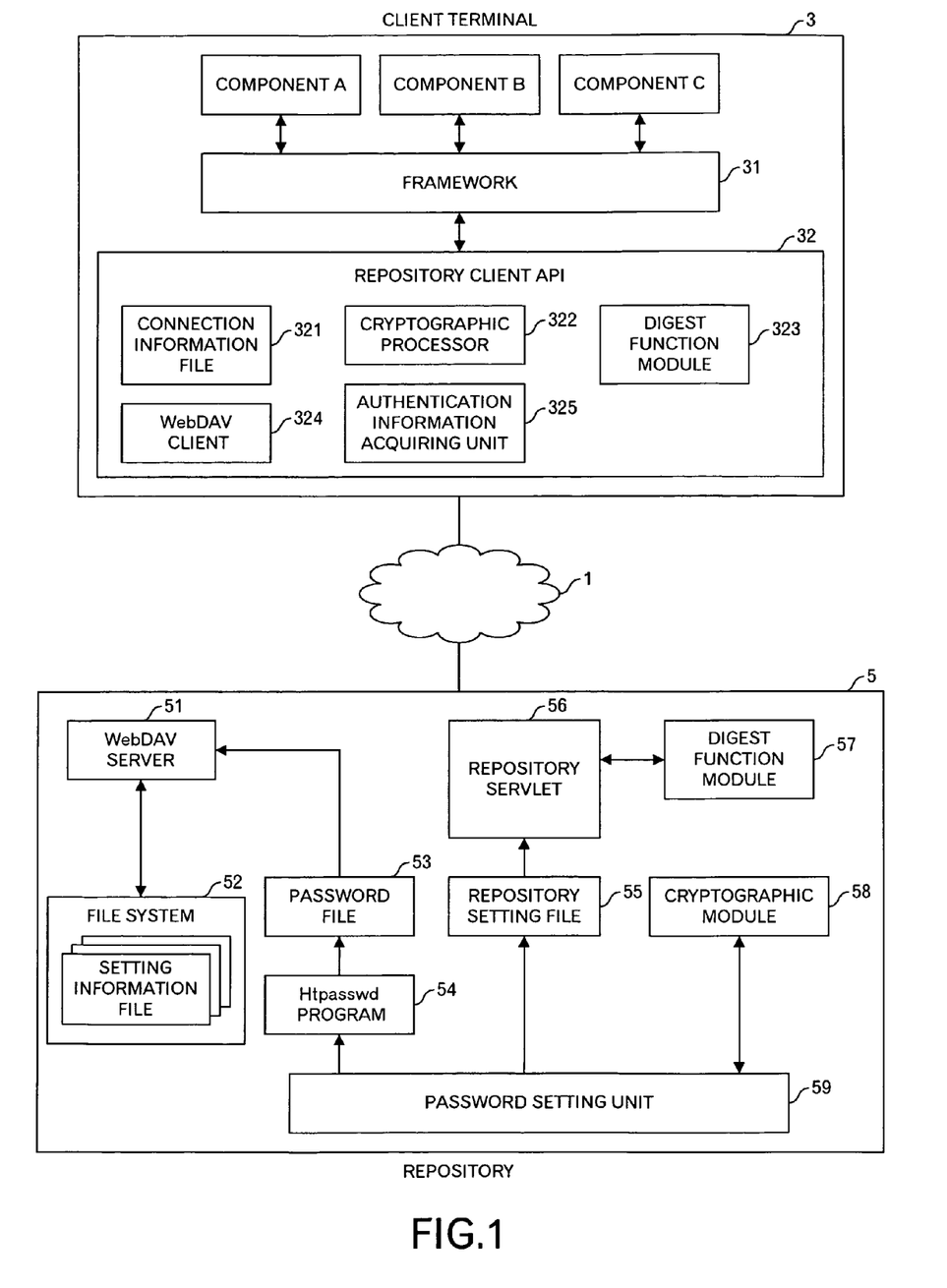
FIG. 1 is a system outline diagram according to one embodiment of this invention.

FIG. 1 shows a system outline figure according to one embodiment of this invention. For example, a network 1 such as an intranet is connected to plural client terminal 3, and one repository 5. The client terminal 3 communicates with the repository 5 according to the Hyper Text Transfer Protocol (HTTP), for example.

In addition, the client terminal 3 includes a framework 31 for carrying out a certain processing; plural components (e.g. components A to C) that use the framework 31, a repository client Application Program Interface (API) 32 that is an interface in the client terminal 3 between the framework 31 and the repository 5.

The repository client API 32 has a connection information file 321 that is used when accessing a Web-based Distributed Authorising and Versioning (WebDAV) server 51 of the repository 5, a cryptographic processor 322 that carries out an encryption and decryption processing for the password or the like, a digest function module 323 that carries out a processing concerning a predetermined digest function, a WebDAV client 324 that carries out a processing against the WebDAV server 51, and an authentication information acquiring unit 325 that acquires the authentication information from the repository 5 and stores it into the connection information file 321. The connection information file 321 includes, for example, a host name of the WebDAV server 51 (e.g. Uniform Resource Locator (URL)), a user ID, and a password.

In addition, the repository 5 includes a file system that stores one or plural setting information files, a password file 53 that stores an ID or IDs and a password or passwords, the WebDAV server 51 that carries out the authentication processing using the password file 53 for accesses (update/read) to the setting information files stored in the file system 52, a repository setting file 55 that stores information of the same ID or IDs and the same password or passwords as in the password file 53, a digest function module 57 that carries out a processing concerning the predetermined digest function, a cryptographic module 58 that carries out an encryption or decryption processing, a repository servlet 56 that carries out a distribution processing of the authentication information by using the repository setting file 55 and the digest function module 57, a password setting unit 59 to set the password or passwords, an htpasswd program 54 that carries out a setting processing of the password or passwords for the password file 53 in response to an instruction from the password setting unit 59.

The WebDAV server 51 realizes sharing of files such as the setting information file in the Web server, and carries out communication according to a protocol defined in RFC 2518, and associated processings. Because the normal HTTP packets are used in the WebDAV, it is possible to share the files over the firewall, and it is designed not so as to depend on a specific Operating system (OS) because it is defined in the RFC.

In addition, the password file 53 is a password file used in the Apache, for example, and the ID is registered in text, and the password is encrypted by a predetermined method. The setting/update of the password in the password file 53 used in the Apache is normally carried out in the htpasswd 54. Also in this embodiment, the password file 53 and htpasswd program 54 are used as they are. However, another program may be prepared and used. Incidentally, in the repository setting file 55, at least the password is encrypted by a predetermined method.

Next, a processing flow of the system shown in FIG. 1 will be explained by using FIGS. 2 to 5. Incidentally, it is supposed that the user ID and password have already been stored in the connection information file 321 by any means. However, initially, the password may not be stored.

Figure 2:
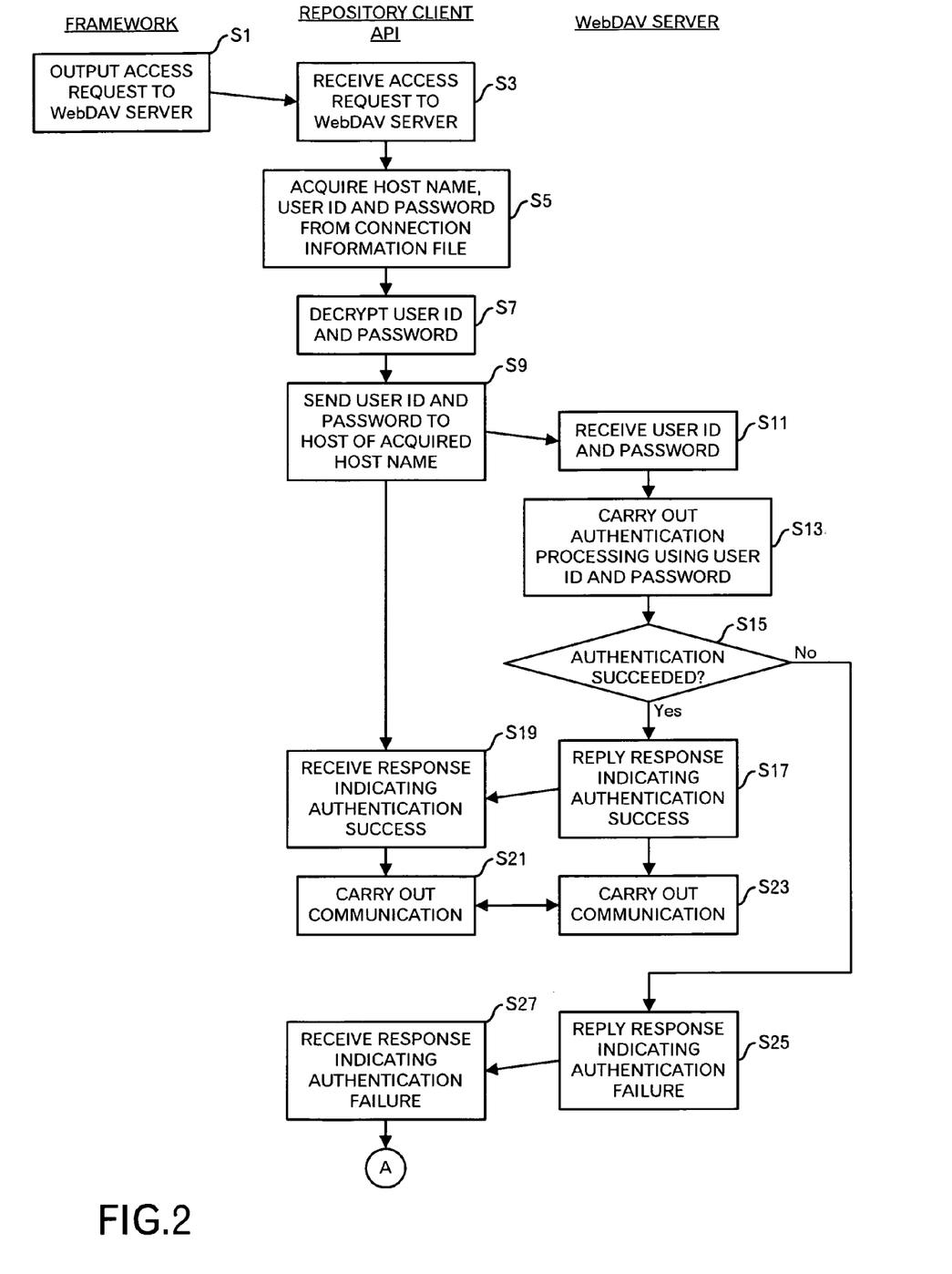
FIG. 2 is a diagram showing a processing flow of an authentication processing according to the embodiment of this invention.

First, when the component A, for example, outputs an access request for the WebDAV server 51 to the framework 31, the framework 31 further outputs the access request for the WebDAV server 51 to the repository client API 32 (step S1). The WebDAV client 324 of the repository client API 32 receives the access request for the WebDAV server 51 from the framework 31 (step S3), and reads out the host name, user ID and password from the connection information file 321 (step S5). In the connection information file 321, the user ID and password are encrypted. Then, the WebDAV client 324 instructs the cryptographic processor 322 to decrypt the read user ID and password, and the cryptographic processor 322 generates the user ID and password in text, and outputs the user ID and password to the WebDAV client 324 (step S7).

The WebDAV client 324 connects to a host (here, the WebDAV server 51) whose host name is acquired from the connection information file 321, and transmits the user ID and password (step S9). Incidentally, when the BASIC authentication is carried out, the user ID and password in text are transmitted as they are, but the cryptographic processor 322 may encrypt them for the WebDAV server 51 in another case.

The WebDAV server 51 receives the user ID and password from the repository client API 32 (step S11), and when the user ID and password are encrypted, they are decrypted. Then, it reads out a password corresponding to the received user ID from the password file 53, and carries out the authentication processing by comparing the read password with the received password (step S13). Incidentally, because the password in the password file 53 is encrypted, the received password is encrypted by the same method, or the password in the password file 53 is decrypted. Then, they are compared.

When it is judged that the authentication succeeded because the received password coincides with the password read out from the password file 53 (step S15: Yes route), the WebDAV server 51 transmits a response indicating the success of the authentication to the client terminal 3 (step S17). The WebDAV client 324 of the repository client API 32 in the client terminal 3 receives the response indicating the success of the authentication from the repository (step S19). Then, the WebDAV client 324 of the repository API 32 communicates with the WebDAV server 51 (steps S21 and S23). After these steps, the component A will communicate with the WebDAV server 51, and necessary processings will be carried out.

On the other hand, when it is judged that the authentication failed because the received password does not coincide with the password read out from the password file 53 (step S15: No route), the WebDAV server 51 transmits a response indicating the failure of the authentication to the client terminal 3 (step S25). The WebDAV client 324 of the repository client API 32 in the client terminal 3 receives the response indicating the failure of the authentication from the WebDAV server 51 (step S27). Then, the processing shifts to a processing shown in FIG. 3 via a terminal A.

The WebDAV client 324 of the repository client API 32 in the client terminal 3 instructs the authentication information acquiring unit 325, and the authentication information acquiring unit 325 transmits a session key request to the repository servlet 56 of the repository 5 (FIG. 3: step S29) The session key request includes the user ID except a case where the user ID is shared by plural client terminals.

Figure 3:
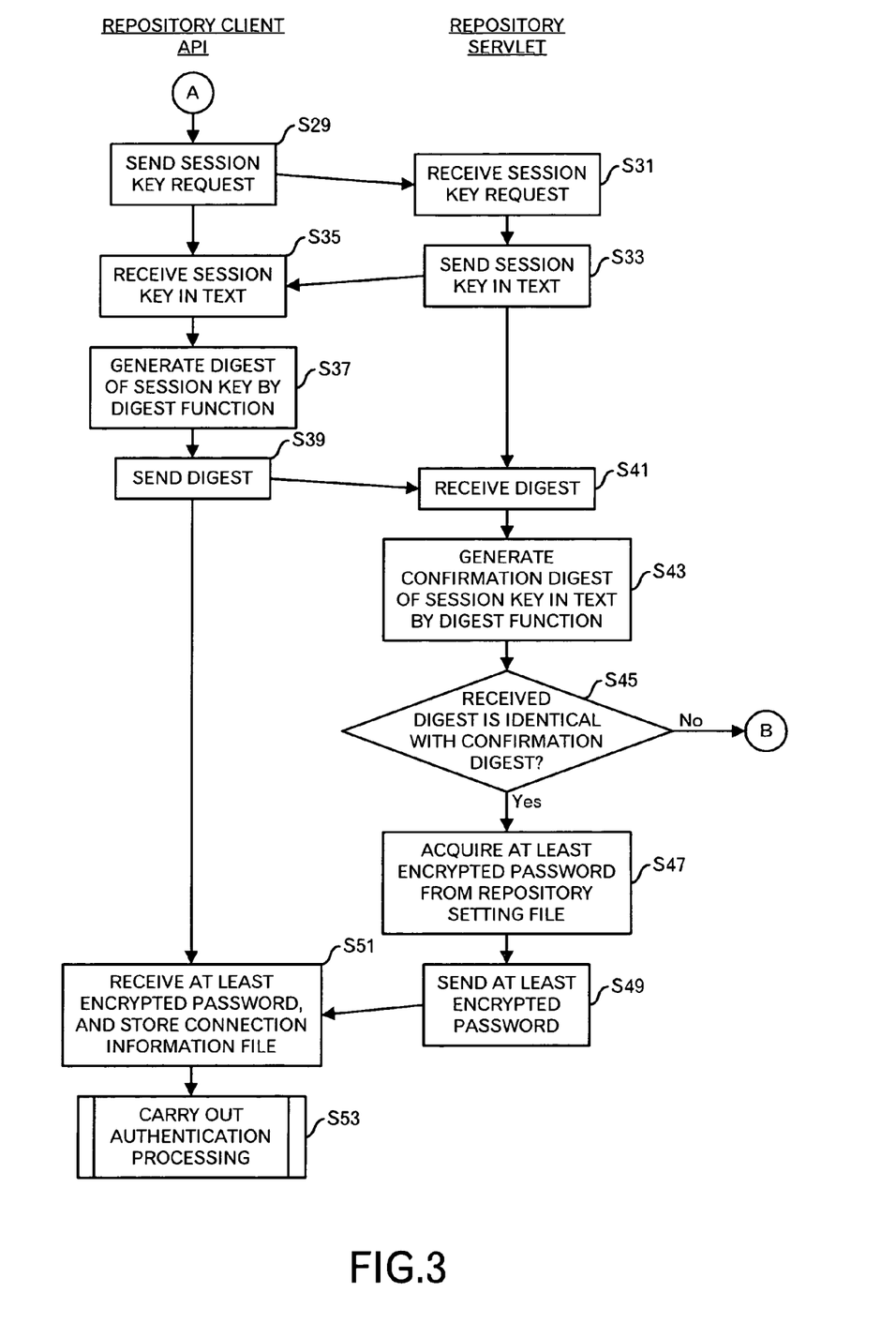
FIG. 3 is a diagram showing a processing flow according to the embodiment of this invention.

When the repository servlet 56 of the repository receives the session key request from the client terminal 3 (step S31), the repository servlet 56 transmits the session key in text to the client terminal 3 (step S33). The transmitted session key is stored in a storage device such as a main memory. In addition, if the user ID is received, the user ID is also stored in stored in the storage device such as the main memory. The authentication information acquiring unit 325 of the repository client API 32 in the client terminal 3 receives the session key in text from the repository servlet 56 of the repository 5, and stores the session key into the storage device such as the main memory (step S35). Then, the authentication information acquiring unit 325 causes the digest function module 323 to generate a digest of the received session key in text (step S37), and transmits the digest to the repository servlet 56 of the repository 5 (step S39). Incidentally, the digest function module 323 also uses a key (not shown) included in the repository client API 32 to calculate the digest for the session key.

The repository servlet 56 receives the digest from the client terminal 3 (step S41), and causes the digest function module 57 to generate a confirmation digest of the session key in text transmitted to the client terminal 3, and stores the confirmation digest into the storage device such as the main memory (step S43). Then, the repository servlet 56 judges whether or not the digest received from the client terminal 3 and the confirmation digest are identical (step S45). When the received digest and the confirmation digest are not identical, the processing shifts to a processing shown in FIG. 4 via a terminal B. This is a case where the digest function is not correct or the key used in the digest function is not correct, and the requesting source is not any legitimate client terminal.

On the other hand, when the received digest and the confirmation digest are identical, the repository servlet 56 reads out an encrypted password corresponding to the user ID received at the step S31, for example, from the repository setting file 55 (step S47). Incidentally, when the user ID is shared with plural users, the user ID and password are encrypted in the repository setting file 55, and read out.

Then, the repository servlet 56 transmits at least the encrypted password to the authentication information acquiring unit 325 of the client terminal via the network 1 (step S49). Because the encrypted password is transmitted as it is, the password is protected. Incidentally, the user ID may be transmitted after the cryptographic module 58, for example, encrypts the user ID. Because the user ID is normally unchanged, it is possible not to transmit the user ID after the user ID initially encrypted is stored into the connection information file 321. However, the user ID in text may be transmitted to make sure. Furthermore, when the user ID is shared with plural users, the encrypted user ID and password are read out and transmitted as they are.

The authentication information acquiring unit 325 receives at least the encrypted password from the repository servlet 56 of the repository 5, and stores it into the connection information file 321 as it is (step S51). When the encrypted user ID is received, the encrypted user ID is stored as it is. Then, the authentication processing according to the steps S3 to S27 in FIG. 2 are carried out again (step S53). Normally, the authentication will succeed, and the normal communication will be carried out (steps S21 and S23). However, when the password is not correctly decrypted, the failure in the authentication occurs again.

Figure 4:
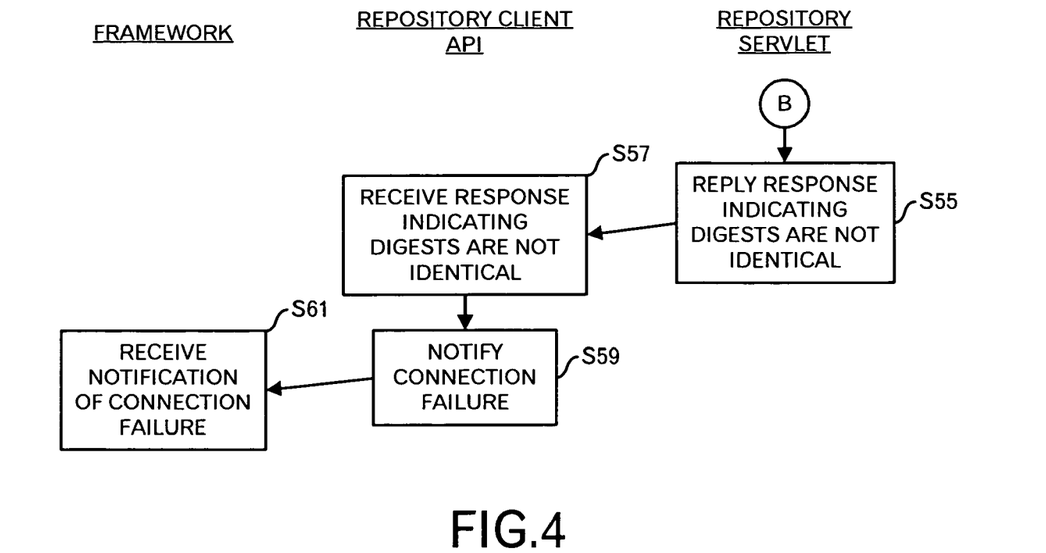
FIG. 4 is a diagram showing a processing flow according to the embodiment of this invention.

When it is judged at the step S45 that the received digest and the confirmation digest are not identical, the repository servlet 56 transmits a response indicating the digests are not identical to the authentication information acquiring unit 325 of the repository client API 32 in the client terminal 3 (step S55). The authentication information acquiring unit 325 of the repository client API 32 in the client terminal 3 receives the response indicating the digests are not identical from the repository servlet 56 (step S57), and outputs a connection failure to the framework 31 (step S59). When the framework 31 receives the connection failure from the repository client API 32 (step S61), the framework 31 also notifies the component A of the requesting source of the connection failure.

By carrying out such a processing, even when the password is changed by a system administrator regardless of the user's intention, or even in an initial state where the password is not stored in the connection information file 321, it is supposed that a failure in the authentication occurs one time, and if the correct digest (i.e. data representing that the user or the client terminal is legitimate or authentic) can be generated and transmitted to the repository servlet 56, a new password is transmitted from the repository servlet 56. That is, when the correct digest function module 323 is provided, the correct digest is generated and the currently valid password is distributed. Therefore, even when the change of the password is not individually notified, or the change of the password is not completely notified to the users or client terminals that are influenced by the change of the password, it becomes possible for the legitimate users or client terminals to obtain the currently valid new password. Because the encrypted password is distributed in the network 1, the distribution of the password is safely carried out.

Figure 5:
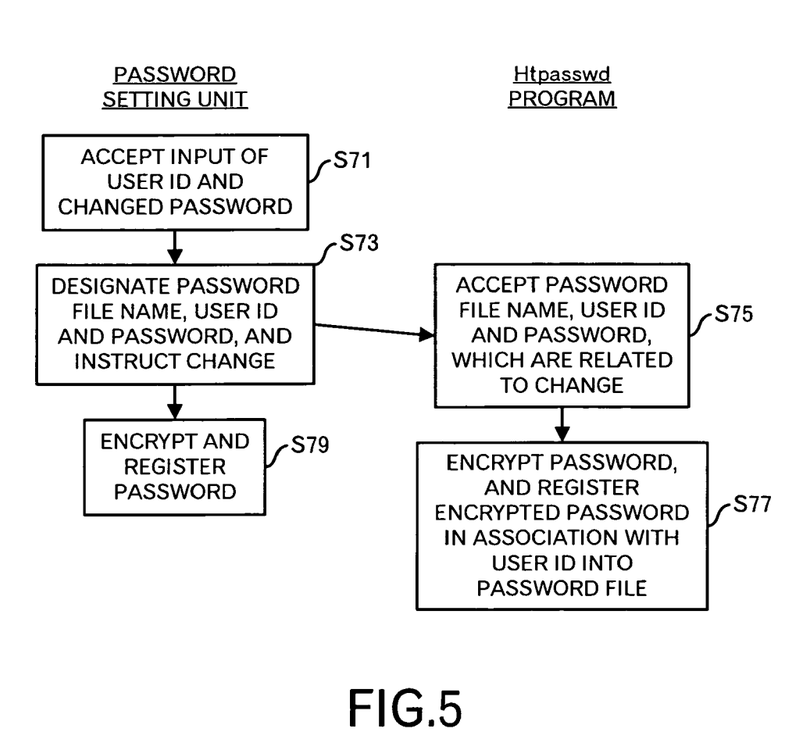
FIG. 5 is a diagram showing a processing flow when the change of the password according to the embodiment of this invention.

Incidentally, the update of the password in the repository 5 is carried out according to a processing flow described below. First, the system administrator of the repository inputs a user ID and a changed password into the password setting unit 59. The password setting unit 59 accepts the input of the user ID and the changed password from the system administrator (step S71), and designates a password file name (because the file name and the storage destination are normally fixed, the password file name and the storage destination, which have already been set, are used), the user ID and the password, and outputs a change instruction to the htpasswd program 54 (step S73). The htpasswd program 54 accepts the password file name, the user ID and the password, which are related to the change, from the password setting unit 59 (step S75), and encrypts the password, and stores the encrypted password into the password file 53 in association with the user ID (step S77).

In addition, the password setting unit 59 causes the cryptographic module 58 to encrypt at least the password, and stores the encrypted password into the repository setting file 55 in association with the user ID (step S79). Incidentally, when the user ID is shared with the plural users or plural client terminals 3, the user ID itself may be encrypted. The encryption is carried out so that the client terminal 3 corresponding to the user ID can decrypt.

Thus, the system administrator can update the password only in a security viewpoint without the users or the client terminals into account. At that time, he or she does not need to distribute the password to the users or the client terminals.

Although one embodiment of this invention is described above, this invention is not limited to this embodiment. For example, in the aforementioned example, it is supposed that the currently valid password and user ID are stored in the repository setting file 55, but, when the change history (e.g. an old password by one generation) of the password is stored in the repository setting file 55, for example, it is possible that the session key request includes the user ID and the past password, and the session key is issued after it is confirmed whether or not the past password is identical. Thereby, the security degree can be enhanced more.

In addition, although the encrypted user ID and password are stored in the connection information file 321 at the step S51, it is possible to store them into the connection information file 321 after the step S19 carried out again at the step S53. This enables the input of the password into the connection information file 321, after the password that is able to use hereinafter is confirmed.

Furthermore, the functional block diagram shown in FIG. 1 is a mere example, and it does not always indicate an actual program module configuration. In addition, this invention is not limited to the authentication processing in the WebDAV server 51.

Incidentally, the repository servlet 56 and the WebDAV server 51 may be implemented by one computer or by plural servers.

In addition, the type of the cryptography implemented by the cryptographic processor 322 and/or cryptographic module 58 may be the Advanced Encryption Standard (AES), or another cryptographic method (e.g. common key cryptosystem). In addition, the digest function may be one of various digest functions, which are currently used. In the above example, the repository servlet 56 does not use the cryptographic module 58. However, in order to adopt a cryptographic system within the repository 5, which is different from a cryptographic system outside of the repository 5, the repository servlet 56 may use the cryptographic module 58 to change the cryptographic method.

Figure 6:
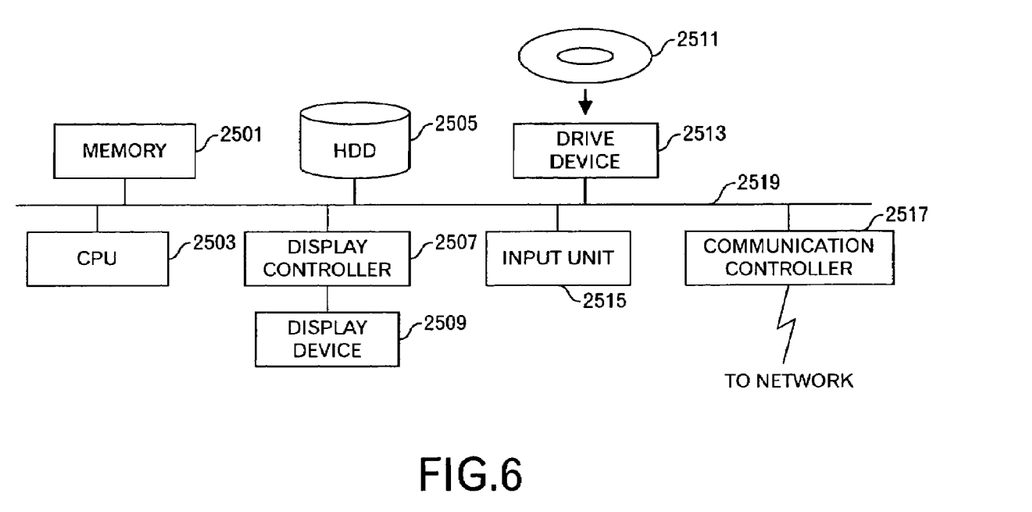
FIG. 6 is a functional block diagram of a computer.

Incidentally, the client terminal 3 and/or repository 5 are computer devices as shown in FIG. 6. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 28. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A computer, comprising:
   an authentication request unit to request authentication using predetermined authentication information for an access destination via a network;
   a unit to receive notification indicating an authentication failure from said access destination; and
   an acquiring unit to acquire currently valid authentication information from an authentication information manager by transmitting data to indicate own legitimacy, and to store the acquired currently valid authentication information into a storage device, and
   wherein said authentication request unit requests said authentication using said acquired currently valid authentication information for said access destination via said network, and
   said acquiring unit transmits a session key request to said authentication information manager, receives said session key from said authentication information manager, generates a digest corresponding to said session key by a predetermined digest function, and transmits said digest to said authentication information manager, and
   when said digest is judged by said authentication information manager to be legitimate, said acquiring unit receives said currently valid authentication information from said authentication information manager.

2. A communication processing method, comprising:
   requesting authentication using predetermined authentication information for an access destination via a network;
   receiving notification indicating an authentication failure from said access destination;
   acquiring currently valid authentication information from an authentication information manager by transmitting data to indicate own legitimacy, and storing the acquired currently valid authentication information into a storage device; and
   requesting said authentication using said acquired currently valid authentication information for said access destination via said network, and
   wherein said acquiring comprises:
      transmitting a session key request to said authentication information manager;
      receiving said session key from said authentication information manager;
      generating a digest corresponding to said session key by a predetermined digest function, and transmitting said digest to said authentication information manager; and
      when said digest is judged by said authentication information manager to be legitimate, receiving said currently valid authentication information from said authentication information manager.

3. The communication processing method as set forth in claim 1, wherein said transmitting said session key comprises: requesting said authentication using said predetermined authentication information for said authentication information manager via said network.

4. The communication processing method as set forth in claim 1, further comprising:
   receiving notification of an authentication success based on said currently valid authentication information from said access destination; and
   storing said currently valid authentication information into an authentication information storage.

5. A computer system, comprising:
   a processing server to carry out an authentication processing by predetermined authentication information;
   an authentication information manager to hold authentication information used in said authentication processing carried out by said processing server in an authentication information storage, and to distribute said authentication information to a client terminal that uses said authentication information; and
   a client terminal to use said authentication information and accesses said processing server, and
   wherein after new registration or update of said authentication information used in said authentication processing carried out by said processing server occurs, said processing server notifies said client terminal of an authentication failure when an authentication request is received from said client terminal, and
   said authentication information manager transmits newly registered or updated currently valid authentication information to said client terminal when data indicating legitimacy of said client terminal is received from said client terminal, and
   said data indicating said legitimacy of said client terminal is a value of a predetermined digest function for a session key given from said authentication information manager.

6. A non-transitory computer-readable storage medium storing a program for causing a computer to carry out a communication process comprising:
   requesting authentication using predetermined authentication information for an access destination via a network;
   receiving notification indicating an authentication failure from said access destination;

acquiring currently valid authentication information from an authentication information manager by transmitting data to indicate own legitimacy, and storing the acquired currently valid authentication information into a storage device; and requesting said authentication using said acquired currently valid authentication information for said access destination via said network, and wherein said acquiring comprises:

transmitting a session key request to said authentication information manager;

receiving said session key from said authentication information manager;

generating a digest corresponding to said session key by a predetermined digest function, and transmitting said digest to said authentication information manager; and when said digest is judged by said authentication information manager to be legitimate, receiving said currently valid authentication information from said authentication information manager.

* * * * *